United States Patent
Zhu et al.

(10) Patent No.: US 6,587,356 B2
(45) Date of Patent: Jul. 1, 2003

(54) START-UP CIRCUIT AND CONTROL FOR HIGH POWER ISOLATED BOOST DC/DC CONVERTERS

(75) Inventors: Lizhi Zhu, Westland, MI (US); Jin-Sheng Lai, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 09/866,304

(22) Filed: May 24, 2001

(65) Prior Publication Data

US 2002/0159280 A1 Oct. 31, 2002

Related U.S. Application Data

(60) Provisional application No. 60/271,184, filed on Feb. 23, 2001.

(51) Int. Cl.[7] ............................................. H02M 3/335
(52) U.S. Cl. ................... 363/17; 363/56.02; 363/56.05; 363/49; 323/908
(58) Field of Search .......................... 363/15–17, 49, 363/98, 132, 55, 56.01, 56.02, 56.05, 56.06, 56.08, 56.12; 323/908, 901; 361/93.9, 94, 58, 57

(56) References Cited

U.S. PATENT DOCUMENTS

| | | | |
|---|---|---|---|
| 3,986,097 A | | 10/1976 | Woods |
| 4,980,813 A | * | 12/1990 | Wells ......................... 363/106 |
| 5,510,974 A | * | 4/1996 | Gu et al. ..................... 363/134 |
| 5,745,351 A | | 4/1998 | Taurand |
| 5,847,942 A | * | 12/1998 | Bazinet et al. ................ 363/25 |
| 5,991,670 A | | 11/1999 | Mufford et al. |
| 6,038,142 A | * | 3/2000 | Fraidlin et al. ............. 363/132 |
| 6,314,002 B1 | * | 11/2001 | Qian et al. ................ 363/21.04 |
| 6,330,170 B1 | * | 12/2001 | Wang et al. ................... 363/17 |

OTHER PUBLICATIONS

Lizhi Zhu, Kunrong Wang, Fred C. Lee, Jih–Sheng Lai, "New Start–Up Schemes for Isolated Full–Bridge Boost Converters", 15th Annual Applied Power Electrical Conference & Exposition, Mar. 2000 IEEE, pp. 309–313.

* cited by examiner

Primary Examiner—Michael Sherry
Assistant Examiner—Gary L. Laxton
(74) Attorney, Agent, or Firm—Seed IP Law Group PLLC

(57) ABSTRACT

The invention is a scheme for high power isolated full-bridge boost DC/DC converters to minimize the effect of in-rush current during start-up. A single pulse width modulation controller (PWM) is possible for the present invention for not only start-up but also normal boost modes. A primary circuit can have a clamping switch or at least two choke diodes. The choke diode can include "push-pull" and "L"-type configurations. A resistor can be used to dissipate energy clamped from the voltage spike. A startup circuit can be used to eliminate the in-rush current experienced during start-up. The proposed start-up schemes have been experimentally verified using a 1.6 kW, 12V/288 V prototype. Since the present invention eliminates the need to match characteristics of multiple controllers, it significantly reduces the cost associated with implementing this type of technology.

23 Claims, 5 Drawing Sheets

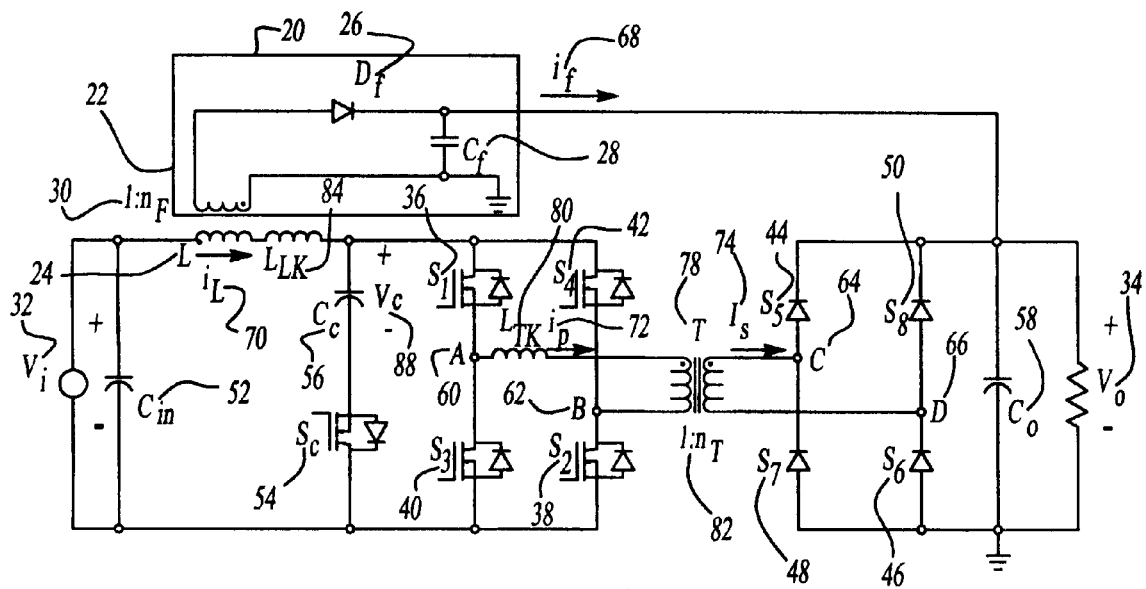
*Fig-1*
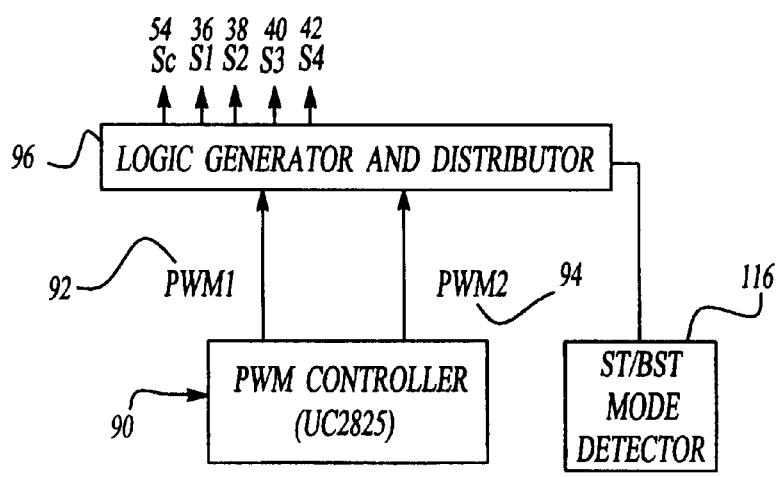
*Fig-2*
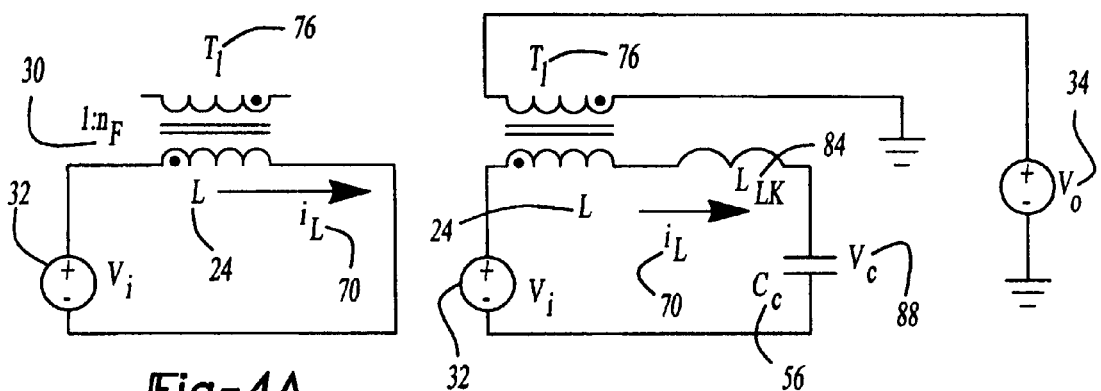
*Fig-4A*    *Fig-4B*

START-UP CIRCUIT AND CONTROL FOR HIGH POWER ISOLATED BOOST DC/DC CONVERTERS

This application is the non-provisional application of provisional patent application No. 60/271,184 titled, "Start-Up Circuit and Control for High Power Isolated Boost DC/DC Converters," filed Feb. 23, 2001.

BACKGROUND OF THE INVENTION

1. Field of the Invention

The present invention relates generally to a DC/DC converter and specifically to a system and method to efficiently and effectively start-up high power isolated boost DC/DC converters.

2. Discussion of the Prior Art

The need to reduce fossil fuel consumption and emissions in automobiles and other vehicles predominately powered by internal combustion engines (ICEs) is well known. Vehicles powered by electric motors attempt to address these needs.

Typically, a vehicle propelled by an electric motor can use batteries or fuel cells to generate the necessary current. Fuel cells generate electrical power through an electrochemical reaction of a fuel and oxidant, such as hydrogen and oxygen. Water is the product of the electrochemical reaction in a fuel cell utilizing hydrogen and oxygen, a product that is easily disposed. See generally, U.S. Pat. No. 5,991,670 to Mufford.

The desirability of using electric motors to propel a vehicle is clear. There is great potential for reducing vehicle fuel consumption and emissions with no appreciable loss of vehicle performance or drive-ability. Nevertheless, new ways must be developed to optimize these potential benefits.

One such area of electric vehicle (EV) development is converting direct current (DC) generating devices such as fuel cells and batteries for their appropriate load. Ideally, the current generators (such as a high voltage (HV) battery or fuel cell) and loads (such as a vehicle's 12 volt powered accessories) would all be at the same voltage level. Unfortunately, this is not presently the case. For example, the conventional 12-volt system still exists in an electric vehicle to power the conventional 12-volt loads such as lights, sensors and controllers, while a high voltage bus (for example, 300-V) feeds the traction inverter and motor. There is a dual-voltage power system in the electric vehicle and energy needs to be transferred bi-directionally between the two voltage systems.

Therefore, a successful implementation of electric traction motor propelled vehicles requires an effective bi-directional DC/DC converter. The converter must be bi-directional because the high voltage bus can be used as a current load during start-up or as a current generator. Similarly, the 12-volt battery can be used as a current generator or as a load while charging. DC/DC converters are known in the prior art. Even bi-directional DC/DC converters are known. See generally, U.S. Pat. No. 5,745,351 to Taurand and U.S. Pat. No. 3,986,097 to Woods.

One type of possible isolated full-bridge boost converter that could be useful in an automotive application is one operation mode of a bi-directional DC/DC converter. Isolated full-bridge boost converters are known in the prior art. They boost the voltage from 12-V to about 300-V to start up the fuel cell EV and also provide galvanic isolation between the high voltage bus and 12-V bus. An isolated full-bridge boost converter is also attractive in applications such as single-stage power factor correction (PFC) converters with isolation requirement.

Similar to other current-fed converters, an isolated full-bridge boost converter has several design advantages such as multi-output capability with one shared choke and inherent over-current and short circuit protection. Unfortunately, isolated full-bridge boost converters have not enjoyed widespread application because they require an additional start-up circuit. Further, transformer leakage inductance causes high transient voltage across the bridge switches during commutation transition. Since the circuitry must be able to withstand the voltage spike, high voltage rated switches are required. This makes the circuitry much more expensive. Alternatively, this high transient voltage could be clamped (or damped), thus allowing the use of more inexpensive switches.

Unfortunately, there is no known technology to efficiently and effectively reduce the start-up "in-rush" current of a high power isolated boost DC/DC converter. High power converters would be typically more than 1 kw. Such technology would make a converter circuit more practical, cost effective and would facilitate widespread application for the isolated boost converters.

SUMMARY OF THE INVENTION

Accordingly, an object of the present invention is to provide an efficient and cost effective high power bi-directional DC/DC converter suitable for automotive applications.

Specifically, the present invention is a scheme for high power isolated full-bridge boost DC/DC converters to minimize the effect of in-rush current during start-up process. A single pulse width modulation controller (PWM) is possible for the present invention for not only start-up but also normal boost modes.

A primary circuit can have a clamping switch or two clamping choke diodes. The clamping diodes can include "push-pull" and "L-type" configurations. A resistor or small buck converter can be used to dissipate energy clamped from the voltage spike. A startup circuit can also use the clamping circuit to clamp the voltage spike experienced during start-up.

Since the present invention eliminates the need to match characteristics of multiple controllers, it significantly reduces the cost associated with implementing this type of technology.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which:

FIG. 1 illustrates an active-clamp isolated boost DC/DC converter with start-up circuit;

FIG. 2 illustrates a functional logic diagram for isolated boost-type DC/DC converter;

FIGS. 4a and 4b illustrate an equivalent circuit in 4-ON interval and 4-OFF interval in start-up mode;

DETAILED DESCRIPTION OF THE INVENTION

Figure 3A:
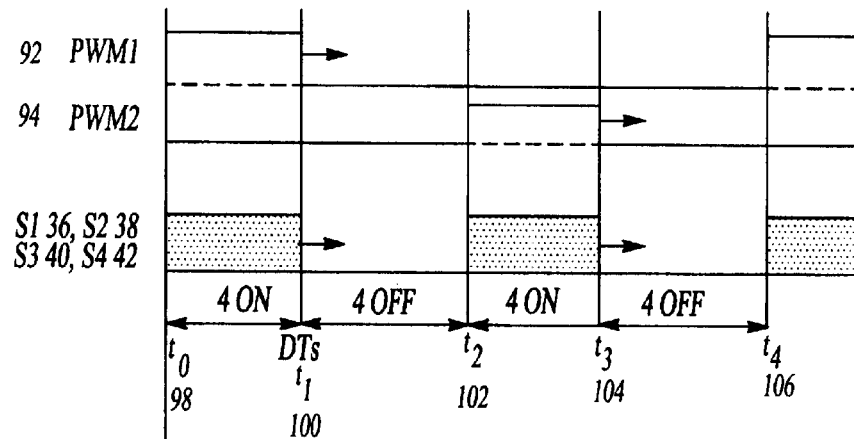
FIGS. 3a and 3b illustrate a proposed timing diagram in start-up mode and normal boost mode.

The present invention relates generally to a DC/DC converter and specifically to a system and method to efficiently and effectively startup high power isolated boost DC/DC converters.

The purpose of a start-up circuit for a boost-type converter is to establish an initial output voltage before the converter operates in its normal "boost" mode. The boost mode represents the normal operation of the converter. In a boost type converter, the initial output voltage should not be lower than the "reflected" input voltage in normal boost mode. Otherwise, a huge "in-rush" current will appear, which is not acceptable and is potentially harmful in most of the applications. In a low power factor correction (PFC) pre-regulator, solutions such as putting a thermistor or resistor in parallel with a bypass switch are normally chosen for an auxiliary start-up circuit. In a high power isolated boost-type DC/DC converter, however, the loss associated with the thermistor or resistor is not acceptable and an additional fly-back winding coupled at the boost choke is needed to realize the start-up function.

As for transformer leakage inductance associated switching voltage spike, the solution can be adding either an active or passive clamping circuit known in the prior art. A typical passive clamping circuit consists of a diode, a capacitor and a resistor. An active clamping circuit replaces the diode in the passive clamping circuit by a controller such as a switch. Although the circuit example in the present invention utilizes an active clamp, the proposed start-up clamping embodiments can be applied to a passive-clamp or other types of isolated boost converters as well.

A new start-up scheme, as well as a boost mode scheme, for an active-clamp type isolated full-bridge boost converters for high power circuits are described in the present invention. The converter can be configured to be one directional or bi-directional. The control timing for the start-up scheme, which is compatible with the pulse width modulation (PWM) control timing for the normal boost mode operation, is also described. Operation principles and steady-state analysis are discussed below. Design considerations on the relationships between the turns ratios of the coupled inductor windings and the main transformer windings, and its effects on the operation of the converter, are discussed below and illustrated in FIG. 9. The proposed start-up scheme is experimentally verified on a 1.6 kW, 12 v/288 V prototype.

Although the present invention has been successfully tested on a 1.6 kW bi-directional DC/DC converter for a fuel cell system, several other types of applications would be readily apparent to one skilled in the art. Such examples could include: bi-directional charging between fuel cell and battery; bi-directional charging between a low voltage battery and a high voltage battery; and an uninterrupted power supply application "UPS."

A possible active clamped isolated boost DC/DC converter circuit is illustrated in FIG. 1. Generally, the operation of inductive storing converters is based on energy transfer cycles. This includes a period of accumulation of magnetic energy in an inductive device from a source (such as a 12V battery) through a circuit, followed by a period of restitution of this energy to a load (such as a high voltage auxiliary compressor drives in fuel cell car) through another circuit. A converter whose inductive element is a single winding inductance is referred to as a "buck-boost" converter. A converter whose inductive element is a transformer including at least two windings is a "fly-back" converter.

The present invention relates in particular to a DC/DC converter. This converter can be bi-directional and transform energy from primary to secondary circuits and from the secondary to primary circuits if using diodes as controllers for S5, S6, S7 and S8 (see below). The converter of the present invention is particularly adapted to accommodate complex loads and transfer energy between two voltage buses at different voltage levels.

In a DC/DC converter (whether one directional or bi-directional), one side of the transformer can be current-fed. This is the primary side circuit. The other side can be voltage-fed. This is the secondary side circuit. The primary side has a high current to charge or discharge the battery. The secondary side has high voltage to withdraw or feed power with a high voltage bus.

The present invention is best understood using the variables as defined below:

| Symbol: | Definition: |
|---|---|
| V | Voltage |
| $V_i$ | low voltage source side |
| $V_o$ | high voltage source side |
| $V_o$ to $V_i$ | buck-mode |
| $V_i$ to $V_o$ | boost-mode |
| S1, S2, S3, S4 | switches that act as an inverter bridge ($V_i$ to $V_o$ in boost mode), or act as rectifier bridge ($V_o$ to $V_i$ in buck mode) |
| S5, S6, S7, S8 | diodes act as a rectifier bridge ($V_i$ to $V_o$ in boost mode), or switches act as inverter bridge ($V_o$ to $V_i$ in buck mode) |
| $I_F$ | fly-back current during start-up mode |
| $I_P$ | transformer primary winding current |
| L | coupled inductor |
| $L_{LK}$ | coupled inductor L leakage inductance |
| $L_{TK}$ | transformer T leakage inductance |
| $I_L$ | inductor L current |
| $D_f$ | high frequency rectifier diode |
| Cc | clamping capacitor |
| $C_f$ | high frequency capacitor |
| $I_s$ | transformer secondary winding current |
| $S_c$ | clamping switch |
| $R_c$ | snubber resistor |
| $C_{in}$ | input capacitor |
| A | node A |
| B | node B |
| C | node C |
| D | node D |
| T | main transformer |
| $n_T$ | turn ratio of main transformer |
| $n_f$ | turn ratio of coupled inducter |
| $C_o$ | output capacitor |
| $P_o$ | output power |
| $V_C$ | voltage across clamping capacitor |
| PWM | pulse width modulation |
| $t_0, t_1, t_2, t_3, t_4$ | times |
| $D_{c1}$ | choke diode |

| Symbol: | Definition: |
|---|---|
| $D_{c2}$ | choke diode |
| $t_0, t_1$ | time interval |
| $t_1, t_2$ | time interval |
| $t_2, t_3$ | time interval |

The DC/DC converter circuit of the present invention illustrated in FIG. 1 has a primary side circuit having a $V_i$ (low voltage source) 32 and a secondary side circuit having a $V_o$ (high voltage source side) 34. Arrows represent the flow direction of current from a current source through the circuit. The primary side of the circuit could have at least two controllers and the secondary side of the circuit could also have at least two controllers. The converter circuit could use either switches or diodes as controllers. For this illustration, the primary side uses switches S1 36, S2 38, S3 40, S4 42, and $S_c$ (clamping switch) 54 as circuit controllers. The secondary side uses diodes S5 44, S6 46, S7 48, and S8 50 for boost converter, although switches could be used for a bi-directional DC/DC converter. The circuit also has an input capacitor $C_{in}$ 52 and a clamping capacitor $C_c$ 56 with a voltage on $C_c$ 56 at $V_c$ 88 on the primary side and an output capacitor $C_o$ 58 on the secondary side. The circuit has four identified nodes as node A 60, node B 62, node C 64, and node D 66. The various circuit currents are an inductor current $I_L$ 70, a transformer primary current $I_p$ 72, and a secondary current Is 74. The circuit has one coupled inductor L 24 and one transformer T 78. Coupled inductor L 24 has a leakage inductance $L_L K$ 84, and a turns ratio of coupled inductor is 1:$n_f$ 30. Transformer T 78 has a leakage inductance $L_{TK}$ 80, and a turn ratio of transformer is 1:$n_t$ 82.

A start-up circuit 20 for the converter is also provided for the circuit. The startup circuit 20 has a start-up fly-back winding, which is coupled with the inductor L, a high frequency rectifier diode $D_f$ 26, and a high frequency capacitor $C_f$ as an output capacitor 28. The start-up circuit can protect the primary circuit switches from in-rush current in the start-up mode. The turn ratio of the fly-back winding with respect to the boost inductor is 1:$n_F$ 30. For the present invention, the number of "$n_F$" is 14. A fly-back current is represented by $I_f$ 68.

The clamping switch $S_c$ 54 and clamping capacitor $C_c$ 56 combination clamp the primary circuit during start-up, which suppresses transient voltage suppression as well as normal boost mode. Thus, the primary circuit controllers are protected from in-rush current during start-up mode. Switches S1 36, S2 38, S3 40, and S4 42 constitute a full-bridge circuit.

The present invention provides a start-up scheme for the converter circuit as illustrated in FIG. 1. FIG. 2 illustrates a functional logic diagram for the activation of the start-up circuit of the scheme. This start-up scheme uses only one commercially available pulse width modulation (PWM) controller, as a circuit controller, for both start-up mode and normal boost mode. The PWM 90 produces a PWM1 control 92 and PWM2 control 94 to a logic generator and distributor 96, which produces control logic for switches $S_c$ 54, S1 36, S2 38, S3 40, and S4 42 on the primary side. PWM1 control 92 and PWM control 94 generate a first and second set of duty cycle control signals.

These primary switches are turned on or off according to a predetermined timing sequence. For example, the PWM controllers can turn on a first pair of primary side diagonal controllers during normal boost mode operation at a rise edge of a first PWM signal. See FIG. 3A below where PWM2 at $t_2$ demonstrates a rise edge (low to high). The PWM can then turn off the first pair of primary side diagonal controllers during boost mode operation at a fall edge of a second PWM signal. See FIG. 3A below where PWM1 at $t_1$ demonstrates a fall edge (high to low).

A transfer from the start-up mode to normal boost mode is activated by a ST/BST Mode Detector Signal 116 known in the prior art. One advantage of this invented technology is the use of one PWM controller chip instead of two PWM controller chips to implement timing logic. The new start-up mechanism eliminates the need to match characteristics of multiple PWM controller chips, thus significantly reducing the cost associated with implementing this type of technology.

Figure 3B:
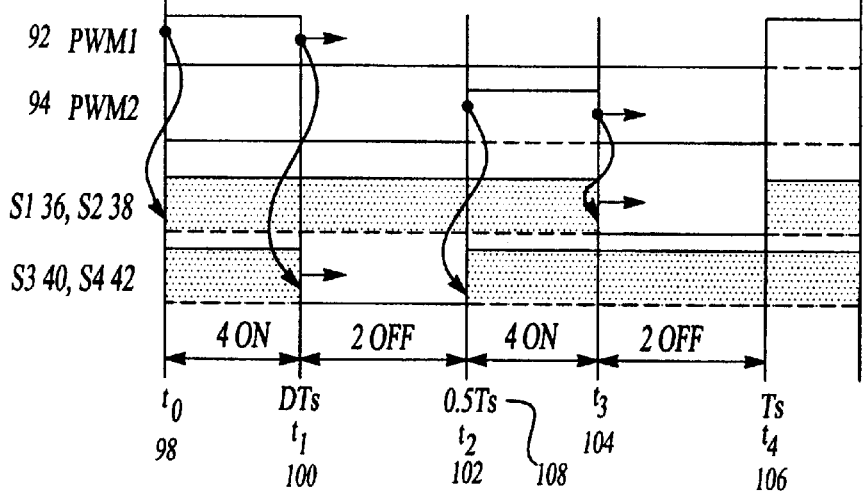

An example to illustrate such a switch timing sequence is shown in FIGS. 3a and 3b. FIG. 3a shows a switching logic timing diagram in start-up mode and FIG. 3b shows a switching logic timing diagram in normal boost mode. In FIG. 3a, the four primary side bridge switches S1 36, S2 38, S3 40, and S4 42 are shown as either all switches "on" or all switches "off" based on the signals from either PWM1 92 and PWM2 94 over times t0 98, $t_1$ 100, $t_2$ 102, $t_3$ 104 and $t_4$ 106. Thus in start-up mode, the intervals are classified as 4-ON and 4-OFF since either PWM signal will cause all four bridge switches to act simultaneously.

In normal boost mode, there are two kinds of intervals, 4-ON and 2-OFF, as shown in FIG. 3b. The 4-ON inveral has the same width as PWM1 92 and PWM2 94. The duty cycle (D) 106 can vary from 0 to 0.5, as illustrated on FIG. 3b. The Ts is the switching period of the converter.

The operating principals surrounding the switching logic of the timing diagram of FIGS. 3a and 3b are as follows. The PWM controllers 92 and 94 predetermine the timing diagram. A duty cycle D 132 of the two PWM control signals is always identical and can vary from 0 to 0.5 since it originates from one controller chip, except PWM1 and PWM2 have an 180 Deg phase shift. When the ST/BST Mode Detector in FIG. 2 is low, the circuit operates in start-up mode and S1 36, S2 38, S3 40, S4 42 are switched on/off at the logic scheme shown in FIG. 3a; when the ST/BST Mode Detector is high, the circuit operates in normal boost mode and S1 36, S2 38, S3 40, S4 42 are switched on/off at the logic scheme shown in FIG. 3b. The ST/BST Mode Detector turns from low to high when the D 132 reaches a certain value between 0 to 0.5. At this design the D 132 threshold value is selected at 0.25.

FIGS. 4a and 4b shows two corresponding equivalent circuit intervals during start-up (4-ON and 4-OFF). FIG. 4a shows the 4-ON interval and FIG. 4b shows the 4-OFF interval. In the start-up mode, the four bridge switches (S1 36, S2 38, S3 40, and S4 42) are turned on and off simultaneously. This mode operates exactly like an active-clamp fly-back converter. Based on a flux balance in the coupled inductor L 24 during one switching period Ts, the steady state output voltage. $V_o$ 34 is $$V_o = \frac{2D}{1-2D} n_F V_i = (1).$$

When duty cycle D 132 reaches $0.25^-$, the output voltage $V_o$ 34 in (1) becomes: $V_o = n_F V_i = (2)$.

Figure 5A:
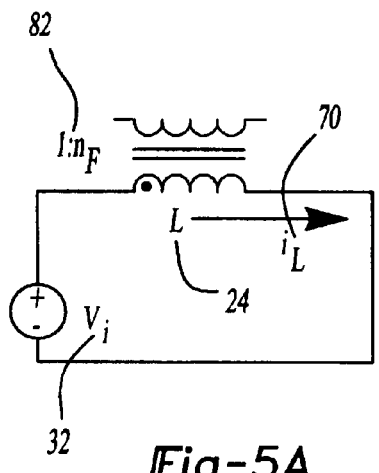
FIGS. 5a and 5b illustrate an equivalent circuit in 4-ON interval and 2-OFF interval in normal boost mode.
Figure 5B:
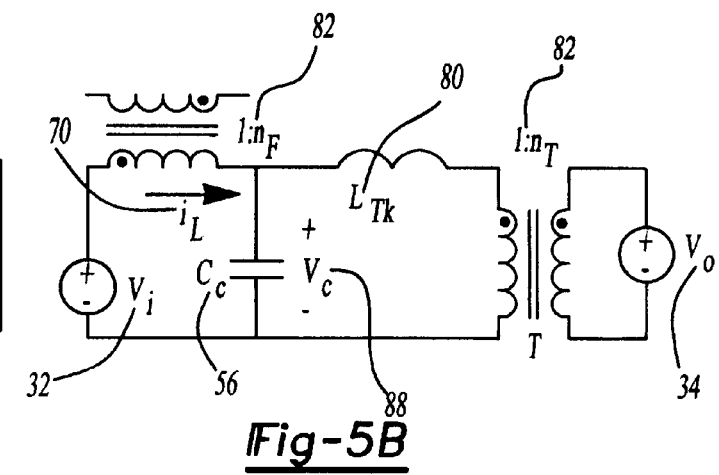

The equivalent circuits of the boost mode intervals of FIG. 3b are illustrated in FIGS. 5a and 5b. Again, the timing diagrams of switches S1 36, S2 38, S3 40, and S4 42 are generated from PWM1 92 and PWM2 94. This mode has two equivalent intervals, a 4-ON and a 2-OFF interval. FIGS. 5a and 5b illustrate the converter circuit in the boost mode 4-ON interval (FIG. 5a) and the boost mode 2-OFF interval (FIG. 5b). The output voltage for this normal boost mode, $V_o$ 34, is $$V_o = \frac{1}{1-2D} n_T V_i = (3).$$

Figure 6:
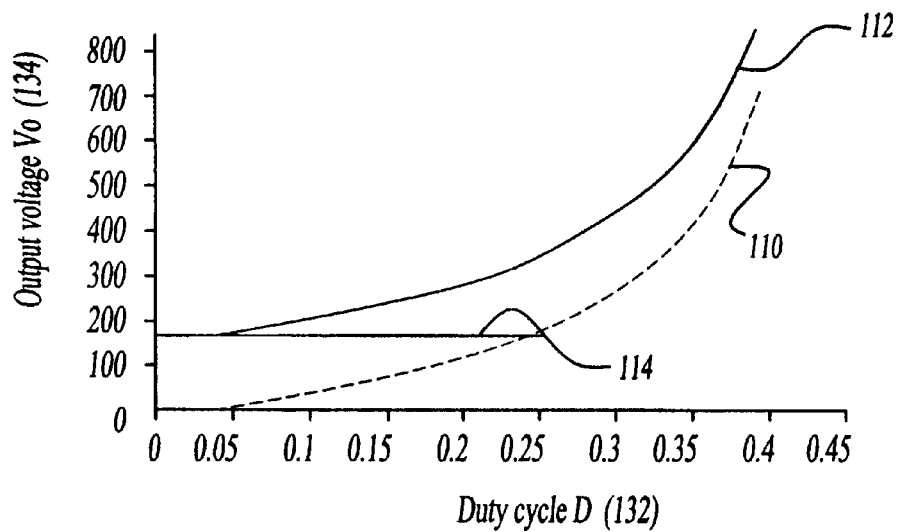
FIG. 6 illustrates Vo vs. D in boost mode including start-up process.

FIG. 6 illustrates the output voltage $V_o$ 34 as a function of duty cycle D 132 for both start-up 110 and normal boost operation 112 modes. FIG. 6 also shows a minimal initial $V_o$ 114 for boost mode.

Figure 7:
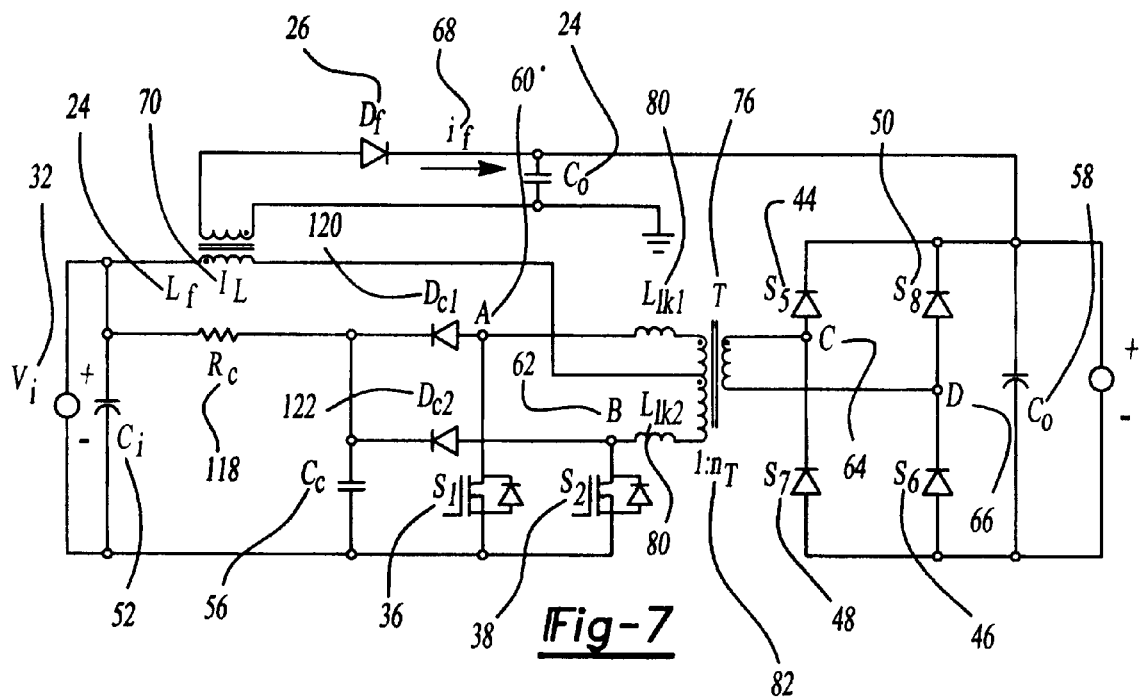
FIG. 7 illustrates a push-pull boost converter with proposed start-up scheme.
Figure 8:
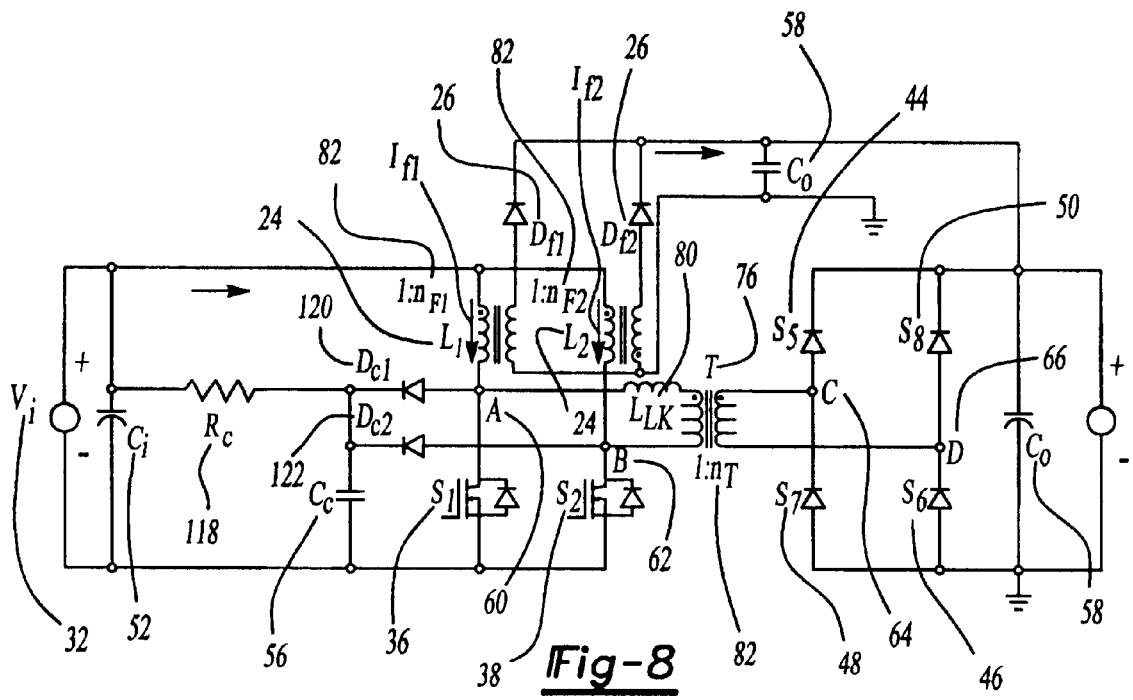
FIG. 8 illustrates an L-type converter with proposed start-up scheme.

Other alternate embodiments of the present converter circuit using different types of configurations are also possible. FIG. 7 illustrates a variation using a "push-pull" converter with the start-up scheme of the present invention. Here switches S3 40 and S4 42 are removed and the clamping switch $S_c$ 54 is replaced with a "push-pull" configuration known in the prior art using $D_{c1}$ 120 and $D_{C2}$ 122. Further, a snubber resistor $R_c$ 118 is added to dissipate energy in a snubber circuit as known in the prior art. FIG. 8 illustrates yet another embodiment using an "L"-type converter. Here, switches S3 40 and S4 42 are removed and the clamping switch $S_c$ 54 is replaced with a "L"-type configuration known in the prior art using choke diodes $D_{c1}$ 120 and $D_{C2}$ 122. Again, the snubber resistor $R_c$ 118 is added to dissipate energy in the snubber circuit. The push-pull and "L"-type configurations, which have a different number of inductors and switches in the primary side, offer more choices for different power and voltage applications.

A 1.6 kW, 12 V/288 V active-clamp isolated full-bridge boost converter has been developed for application using the present invention. The load to the converter is a 63 resistor in parallel with a 2000 μF bus filter capacitor.

Figure 9:
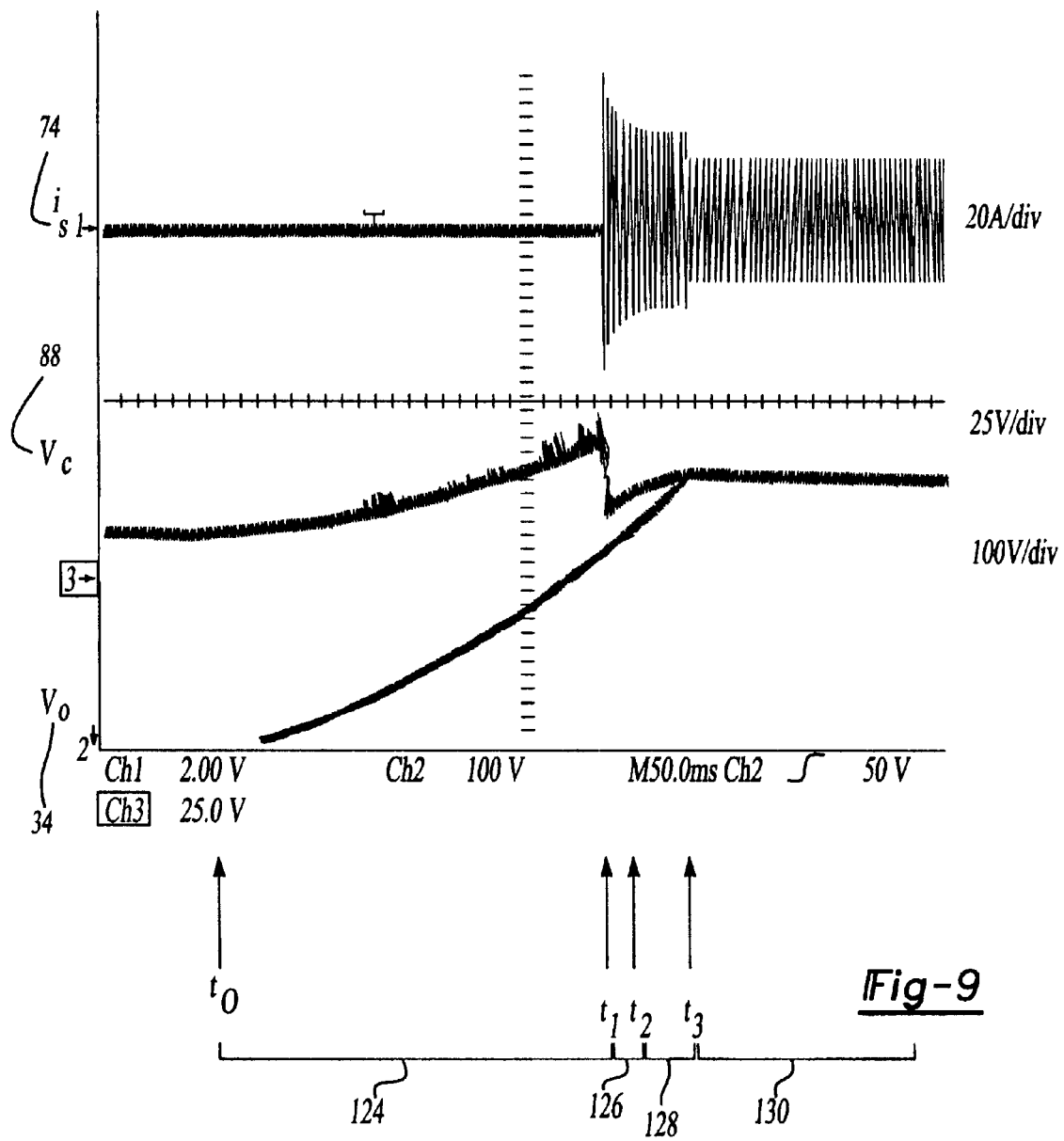
FIG. 9 illustrates a start-up waveform of the invented start-up scheme at an isolated boost full bridge DC/DC converter.

FIG. 9 shows experimental waveforms of the start-up process of the proposed start-up scheme. Three traces, $I_s$ 74, $V_c$ 88, and $V_o$ 34, represent the secondary side current of the secondary side from transformer T 78, the voltage on $C_c$ 56, and the output voltage respectively and as previously described. The test conditions are: $n_F$ 30=$n_T$ 82=12, $V_i$ 32=12 V, $V_o$ 34=290 V, $P_o$ =1.29 kW. Here, $P_o$ is output power to the load.

The waveforms show the entire start-up process, and is divided into several time intervals. During a ($t_0$, $t_1$) interval 124, the converter operates in start-up mode. The duty cycle D 132 is in "open-loop" control and increases linearly. During a ($t_1$, $t_2$) interval 126, the converter is still in open-loop control, but it has been switched to the normal boost mode. During a ($t_2$, $t_3$) interval 128, the inner current loop is de-saturated and then regulated. After a $t_3$ 130, the outer voltage loop is de-saturated and then regulated.

In FIG. 9, $t_1$ occurs when the ST/BST Mode Detector 116 signal shown in FIG. 2 is activated from low to high. This switching point is normally set when duty-cycles of the PWM 90 pulses PWM1 92 and PWM2 94, shown in FIGS. 3a and 3b, reach 0.25. In the start-up scheme of the present invention, only the fly-back winding transfers energy to the output side during the ($t_0$, $t_1$) interval 124.

The above-described embodiments of the invention are provided purely for purposes of example. Many other variations, modifications, and applications of the invention may be made.

We claim:

1. A system to active-clamp an isolated high power boost converter, the system comprising:

a primary circuit comprising at least one bridge leg component;

a secondary circuit comprising at least two bridge leg components;

a transformer coupling the primary circuit and the secondary circuit;

the primary circuit further comprising a clamping switch; and a start-up circuit comprising a high frequency rectifier diode, a high frequency capacitor electrically coupled across the high frequency rectifier diode, and an output capacitor electrically coupled across an output of the secondary circuit, whereby the at least one bridge leg component of the primary circuit is protected from in-rush current in a start-up mode.

2. The system of claim 1 wherein the bridge leg components comprise switches.

3. The system of claim 1 wherein the bridge leg components comprise diodes.

4. The system of claim 1 wherein the primary circuit further comprises at least two clamping diodes in a push-pull configuration.

5. The system of claim 1 wherein the primary circuit further comprises at least two clamping diodes in an L-type configuration.

6. The system of claim 1 wherein the system is one directional.

7. The system of claim 1 wherein the system is bi-directional.

8. The system of claim 1, further comprising:

a single pulse width modulation (PWM) controller controllingly coupled to at least the one bridge leg component of the primary circuit.

9. A system to active clamp isolated high power boost converters, the system comprising:

a primary circuit comprising at least two bridge leg components;

a secondary circuit comprising at least two bridge leg components;

a transformer coupling the primary circuit and the secondary circuit;

the primary circuit further comprising a clamping switch; and a start-up circuit comprising a high frequency rectifier diode, a high frequency capacitor electrically coupled across the high frequency rectifier diode, and an output capacitor electrically coupled across an output of the secondary circuit, whereby bridge leg components of the primary circuit are protected from in-rush current in a start-up mode, wherein the primary circuit further comprises a snubber resistor, whereby clamping energy is dissipated.

10. A method to active-clamp isolated high power boost converters comprised of a transformer connected to a primary circuit and a secondary circuit, comprising:

turning off at least two primary circuit switches during a start-up mode;

activating a start-up circuit;

clamping the primary circuit during the start-up mode using a clamping switch; and snubbing energy, whereby the at least two primary circuit switches are protected from voltage spikes in the start-up mode.

11. The method of claim 10 wherein snubbing energy comprises passing a current through a resistor.

12. The method of claim 10 wherein the system is one directional.

13. The method of claim 10 wherein the system is bi-directional.

14. A boost-mode operation timing control method to determine switching of primary side circuit controllers by a first and a second set of duty cycle control signals, the method comprising:
   turning on a first pair of primary side diagonal bridge leg components during normal boost-mode operation at a rise edge of a first pulse width modulation (PWM) signal;
   turning off the first pair of primary side diagonal bridge leg components during normal boost-mode operation at a fall edge of a second PWM signal;
   turning on a second pair of primary side diagonal bridge leg components during normal boost-mode operation at a rise edge of the second PWM signal;
   turning off the second pair of primary side diagonal bridge leg components during normal boost-mode operation at a fall edge of the first PWM signal;
   turning on all of the primary side diagonal bridge leg components when at least one duty cycle control signal is high;
   alternating between turning off the first pair of primary side diagonal bridge leg components and turning off the second pair of primary side diagonal bridge leg components in subsequent intervals when both duty cycle control signals are low.

15. The method of claim 14 wherein the primary side diagonal bridge leg components are switches.

16. The method of claim 14, wherein the primary side diagonal bridge leg components are switches comprising respective anti-parallel diodes thereacross.

17. The method of claim 14 wherein one pair of primary side diagonal bridge leg components comprises two diagonally located switches.

18. A method of operating a converter comprising two pairs of diagonally opposed switching elements, the method comprising:
   operating in a startup mode during a first time, wherein operating in the startup mode comprises activating both pairs of diagonally opposed switching elements when either of a first and a second pulse width modulated signal is in a first state and deactivating both pairs of diagonally opposed switching elements when neither of the first and the second pulse width modulated signals is in the first state; and
   operating in a boost mode during a second time.

19. The method of claim 18 wherein operating in the boost mode comprises activating both pairs of diagonally opposed switching elements when either of the first and the second pulse modulated signals enters the first state, and deactivating alternating ones of the pairs of diagonally opposed switching elements each time that either of the first and the second pulse width modulated signals leaves the first state.

20. The method of claim 18, further comprising:
   producing the first and the second pulse width modulated signals from a single pulse width modulated controller.

21. The method of claim 18, further comprising:
   producing the first and the second pulse width modulated signals from a single pulse width modulation controller, wherein the second pulse width modulated signal is 180 degrees out of phase with the first pulse width modulated signal.

22. The method of claim 18 wherein the first state is a logical HIGH state and activating the pairs of diagonally opposed switching elements comprises placing each of the diagonally opposed switching elements of the pair in an ON state.

23. The method of claim 18, further comprising:
   determining a duty cycle of the converter; and
   switching between the startup mode and the boost mode when the duty cycle exceeds a threshold duty cycle.

* * * * *

UNITED STATES PATENT AND TRADEMARK OFFICE
CERTIFICATE OF CORRECTION

PATENT NO. : 6,587,356 B2
DATED : July 1, 2003
INVENTOR(S) : Lizhi Zhu et al.

It is certified that error appears in the above-identified patent and that said Letters Patent is hereby corrected as shown below:

<u>Column 9,</u>
Line 6, "primary side circuit controllers" should read as -- primary side bridge leg components --.
Line 25, "signal is high;" should read as -- signal is high; and --.

Signed and Sealed this

Eighteenth Day of May, 2004

JON W. DUDAS
*Acting Director of the United States Patent and Trademark Office*